United States Patent [19]

Henderson et al.

[11] 3,963,624
[45] June 15, 1976

[54] CLARIFIER

[75] Inventors: Angus D. Henderson, Bayside, N.Y.; Francis H. Verhoff, South Bend, Ind.; John M. Periale, Central Islip, N.Y.

[73] Assignee: Telecommunications Industries, Inc., Copiague, N.Y.

[22] Filed: Jan. 7, 1974

[21] Appl. No.: 431,013

[52] U.S. Cl. ............................ 210/521; 210/532 R
[51] Int. Cl.² .......................................... B01D 21/02
[58] Field of Search ................ 210/521, 522, 532 R

[56] References Cited
UNITED STATES PATENTS

| | | | |
|---|---|---|---|
| 3,399,135 | 8/1968 | Conley, Jr. et al. | 210/521 X |
| 3,482,694 | 12/1969 | Rice et al. | 210/522 X |
| 3,640,387 | 2/1972 | Conley et al. | 210/521 X |
| 3,782,557 | 1/1974 | Pielkenrood | 210/521 |
| 3,788,981 | 1/1974 | Richard et al. | 210/521 X |
| 3,812,970 | 5/1974 | Yamazaki | 210/521 X |
| 3,813,851 | 6/1974 | Eder | 210/521 X |

*Primary Examiner*—John Adee
*Assistant Examiner*—Robert H. Spitzer
*Attorney, Agent, or Firm*—Oldham & Oldham Co.

[57] ABSTRACT

A clarifier including a lamina comprising a plurality of substantially parallel spaced apart plates extending at an angle to the vertical. The parameters of the lamina are optimized in accordance with disclosed mathematical relationships depending on whether the tank is circular or rectangular. Means for equalizing the flow of the tank are described, as well as means for supplementary removal of additional particulates after the liquid has passed through the lamina.

17 Claims, 13 Drawing Figures

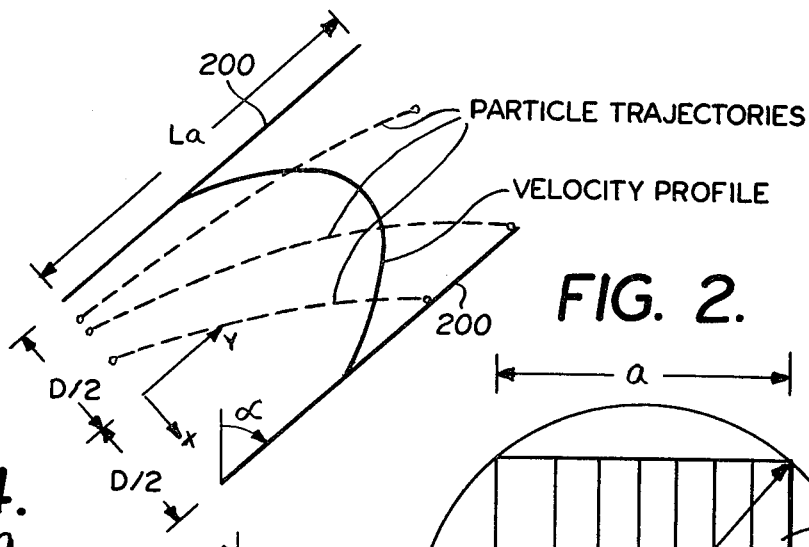
FIG. 1.
FIG. 2.
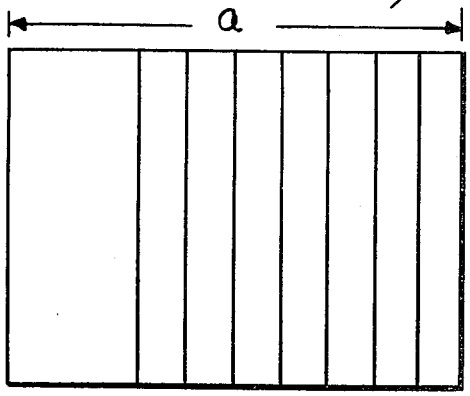
FIG. 4.
FIG. 5.
FIG. 3.
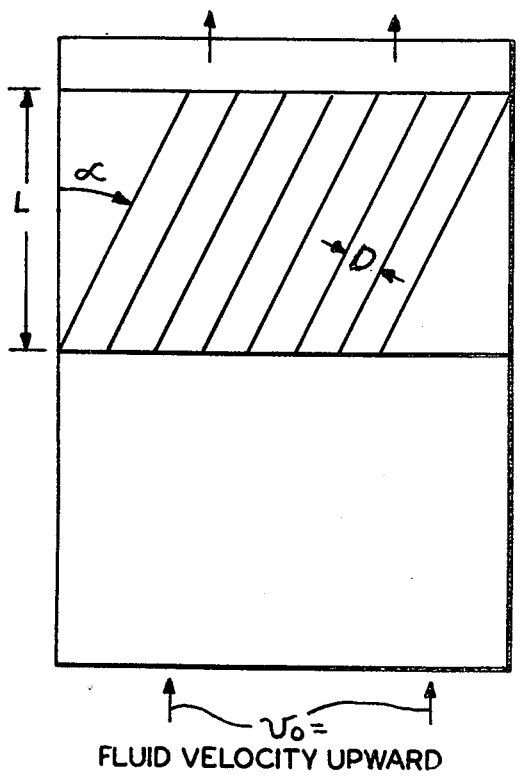
FLUID VELOCITY UPWARD
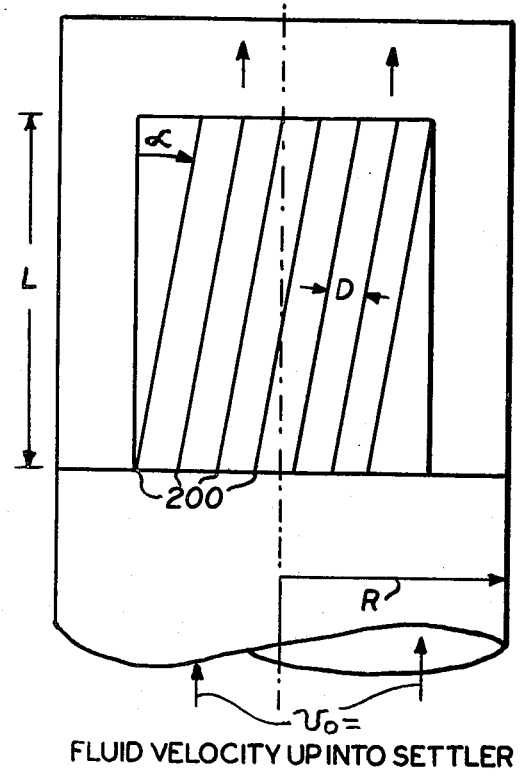
FLUID VELOCITY UP INTO SETTLER

CLARIFIER

BACKGROUND OF THE INVENTION

1. Field of the Invention

This invention relates to clarification devices and particularly to laminas having a plurality of substantially parallel closely spaced angularly extending plates below which liquid to be clarified flows.

2. The Prior Art

Laminas are old and well known. However, prior to this invention, so far as the inventors know, laminas have not been designed for optimal removal of entrained solids from liquids. Moreover, laminas have chronically displayed unequal flow between plates, whereby to yield unequal clarification.

SUMMARY OF THE INVENTION

The invention describes mathematical relationships which optimize clarification for laminas of the type having a plurality of closely spaced substantially parallel angularly extending plates disposed in tanks, be they circular or rectangular in section. In addition, means are described for equalizing flow between plates. Such means may be either a substantial head of clarified liquid above the tops of the plates, or a screen overlying the upper ends of the plates. in addition, supplementary means for removing entrained solids from the clarified liquid are described, which means are in the form of a plurality of troughs extending transversely of the flow of liquid above the plates.

BRIEF DESCRIPTION OF THE DRAWINGS

FIG. 1 is a diagramatic view illustrating particle flow between plates of the lamina;

FIG. 2 is a diagramatic top plan view disposed in a circular tank;

FIG. 3 is a diagramatic sectional view of the tank of FIG. 2;

FIG. 4 is a diagramatic top plan view of a lamina disposed in a rectangular tank;

FIG. 5 is a vertical sectional view of the lamina shown in FIG. 4;

THE LAMINA

Figure 7:
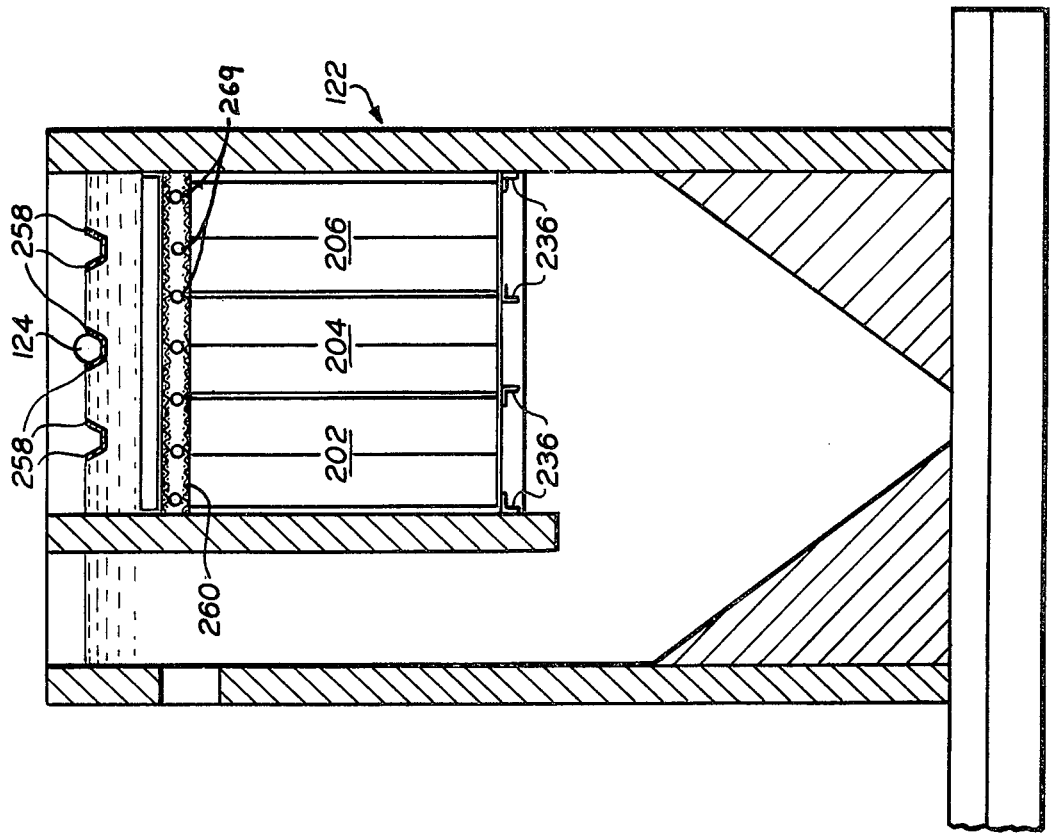
FIG. 7 is a sectional view taken along line 7—7 of FIG. 6.
Figure 6:
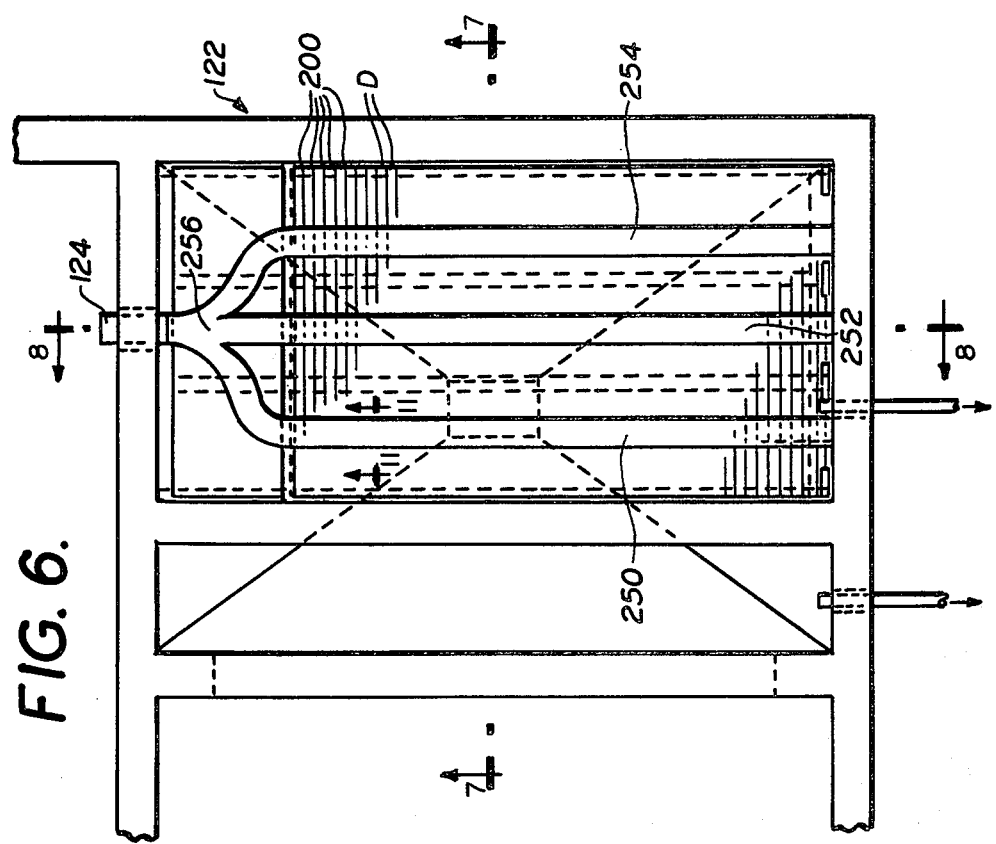
FIG. 6 is a top plan view of a commercial embodiment of a lamina incorporating the present invention.

The preferred lamina for incorporation in the method and apparatus in the present invention is illustrated in FIGS. 5 through 7 wherein the lamina is shown in detail. As is true of all laminas, the lamina 122 is made of a multiplicity of parallel angularly oriented plates 200 that are spaced apart by a space D. The angle at which the plates are oriented and their spacing and the flow rate through the lamina may be optimized for removing the maximum amount of particulate material entrained in the influent of the lamina. This optimization is dependent upon the geometry of the container for the lamina, the flow rate of the plant, and the maximum permissible particle size of the effluent. The design of an optimum lamina given these parameters is determined by mathematical and physical analysis as hereinafter presented.

The present invention is based upon a thorough theoretical analysis of the basic principles operational in these sedimentation devices for both upflow and downflow. More particularly this invention concerns the optimal construction of such devices, i.e., it presents equations which functionally relate the angle of inclination of the substantially flat and parallel plates with the length of the plates and possibly other parameters, such that the maximum amount of solids that can be removed in a given tank size or for a given area of land surface whose normal points in the direction of the gravity vector. For this invention, the reference vector will either be vertical or horizontal depending upon the orientation of the tank and will point in the direction of flow By substantially flat plates is meant the usual rectilinearly smooth surface as well as corrugated plates and plates which for strength reasons are slightly bent as well as sectionalized plates as will be hereinafter described. Parallel plates also include the case where the space between the plates has a wedge shape, although the angle of the wedge must be small.

This invention presents a derivation from fundamental principles of formulae which quantitatively describe the separation process of the parallel plates inserted in the fixed area. These formulae relate the settling velocity of the smallest particle which is to be totally removed by the device to the parameters of the design, such as angle of inclination of the plates, the length of the plates, and the distance between the plates. Also, if a rectangular device is to be installed in a circular area, the optimization is performed on the size of this rectangle. These optimizations are hereinafter carried out for many typical configurations, including both upflow and downflow for the installation of parallel plates into both vertical and horizontal tanks. Both rectangular and circular tanks for available land areas) are considered. In the circular tank case, a rectangular sedimentation device is placed therein.

As was stated above, this invention appies to both rectangular and circular tanks placed in either a vertical or horizontal position. Also, it applies to upflow settlers where the suspended solids are removed from the same end of the plates as the influent enters, as well as the downflow case where the suspended solids are removed from the plate on the same end as the clarified liquid. Since the derivation of the equations which are applicable for each case are the same, except for certain algebraic signs and trigonometric functions, this derivation will be carried out in detail for only the case of upflow in a circular vertical tank. The equations obtained for the other cases will simply be stated by the presentation of general equations which are applicable to the optimal design of any sedimentation device. The appropriate parameter choice for each particular case will be indicated.

In order to understand the operation of these settling devices, the physics of the settling process occurring between the parallel plates must be quantified. FIG. 1 illustrates the potential paths that a particle may take as its is carried through the space between plates 200 by the fluid flow. As can be seen from this Figure, some of the particles with low sedimentation (downward) velocities are carried out from between the plates without sedimentation occurring. By a vectorial summation of the two contributing velocities (the fluid velocity and the sedimentation velocity), one obtains the following components for the velocity of a given particle in the $x$-direction and in the $y$-direction.

$y$-component
$$v_y = \frac{3}{2} v_a \left[1 - \left(\frac{2x}{D}\right)^2\right] - v_t \cos\alpha \quad (1)$$

$x$-component
$$v_x = v_t \sin\alpha \quad (2)$$

For these equations, the angle and length reference vector points in the vertical upward; for the more general cases to be summarized later, the reference vector will point in the direction of the tank axis (or its equivalent in the restricted area case). In the above equations (1) and (2) $v_a$ is the average fluid velocity in the space between the plates; $v_t$ is the settling velocity of a given particle moving through this space, and D is the distance between the plates. The velocity profile is that of laminar flow between plates as is the case for low Reynolds numbers. This laminar flow (equivalently a low Reynolds number) must be maintained to permit efficient sedimentation. The downflow of the suspended solids is assumed negligible, as is the case for the removal of particles from slurries with low concentrations of suspended solids.

FIGS. 4 and 5 illustrate a rectangular lamina device 122 inserted into a circular tank C. As can be seen, the area available for flow through the rectangular area is smaller than that of the circular tank. For a given upflow velocity in the tank, $v_o$, the upflow velocity in the rectangular area is given by the following equation.

$$v_b = \frac{\pi R^2}{a \sqrt{R^2-a^2}} v_o \quad (3)$$

Here R is the radius of the sedimentation tank, and a is the length of a side of the sedimentation device. However, the area of entrance to the lamina 122 is smaller than the area of the rectangle inserted in the circular tank. The relationship between the upflow velocity in the rectangle, $v_b$, and the upflow velocity entering the lamina, $v_c$, is given by the following equation.

$$v_c = \frac{a}{a-L \tan\alpha} v_b \quad (4)$$

Here L is the height of the sedimentation device and $\alpha$ is the angle of inclination of the plates. The vertical upflow in the entrance to the lamina, $v_c$, is related to the average velocity of the fluid between the plates, $v_a$, by the following equation. This results from the fact that the velocity vectors are in different directions.

$$v_a = v_c/\cos\alpha \quad (5)$$

By back substitution, one is able to obtain the velocity components of a particle in the $x$ and $y$ direction (see FIG. 3) as a function of upflow velocity in the tank, settling velocity, and the design parameters for the lamina device.

$y$-component
$$v_y = \frac{3}{2} \frac{\pi R^2}{(a-L \tan\alpha)(R^2-a^2)^{1/2}\cos\alpha} \left[1 - \left(\frac{2x}{D}\right)^2\right] - v_t \cos\alpha \quad (6)$$

$x$-component
$$v_x = v_t \sin\alpha \quad (7)$$

These formulae which quantify the sedimentation phenomena will then be used to generate the equations for optimal design of the sedimentation device.

In general, one would prefer to design a lamina device such that when it was put in the circular tank, it would remove the maximum amount of suspended solids. To accomplish this task exactly requires the knowledge of the probability distribution of particle settling velocities in the influent suspension. Since this information is rarely known, and when known it is subject to experimental error, another approximate optimization objective must be chosen.

As an approximate objective for optimization, one could minimize the particle size (equivalently particle settling velocity), which will be totally removed as it passes through the space between the plates. Referring to FIG. 3, one is interested in a particle whose trajectory starts at the point $x = -D/2$ and $y = 0$ and ends at the point $x = D/2$ and $y = L_a$. Depending upon the parameters of the lamina device (i.e., angle of inclination, etc.), and the upflow velocity, $v_0$, a particle with a certain critical settling velocity, $v_{tc}$, will follow this trajectory. Any particle with a settling velocity above this critical velocity will be totally removed from the fluid, whereas those particles with settling velocity lower than this value will be only partially removed. The goal of designing the lamina sedimentation device to minimize this critical settling velocity will be the objective used in this invention. It can be shown that this design criteria very nearly approximates the design criteria for the maximum removal of suspended solids.

To determine the settling velocity corresponding to this critical settling velocity, the relationship between the $x$ coordinate and the $y$ coordinate of the settling particle must be attained. By noting the definition of velocity as the rate of change of the distance variable with time, $$dx/dt = v_x \quad (8)$$

$$\frac{dy}{dt} = v_y \quad (9)$$

one derives the following first order differential equation describing the trajectories of settling particles.

$$\frac{dy}{dx} = \frac{3}{2} \frac{\pi R^2}{(a-L \tan\alpha)(R^2-a^2)\cos\alpha \sin\alpha} \left[1 - \left(\frac{2x}{D}\right)^2\right] - v_t \cot\alpha \quad (10)$$

However, we are interested in one particular trajectory, i.e., the one beginning at $x = -D/2$ and $y = 0$ and ending at $x = D/2$ and $y = L_a = L/\cos\alpha$. Performance of the integration between these desired limits yields the following relationship for the critical settling velocity as a function of the design parameters of the system.

$$\epsilon = \frac{v_{tc}}{v_o} = \frac{\pi(D/r)}{[4-(a/R)^2][(a/R)\cos\alpha - (L/R)\sin\alpha][(L/R)\tan\alpha + (D/R)\cos\alpha]} \quad (11)$$

where $v_{tc}$ = critical settling velocity, i.e., the settling velocity of the particle which follows the critical trajectory.

The equation has been rearranged such that the optimal ratio of settling velocity to upflow velocity is to be found. In other words, the optimal design of the sedimentation device is independent of the upflow velocity, $v_o$. Hence, for a given diameter of tank, the optimal sedimentation device can be designed without considering the flow or settling characteristics of the suspension to be clarified. These fluid characteristics need only be used in deciding upon the diameter of the sedimentation tank.

Inspection of equation (11) indicates that minimization of the critical settling velocity ratio can be performed with respect to three variables: the angle of inclination of the plates, $\alpha$, the height of the sedimentation unit, $L$, and the length of the side of the rectangle inserted in the circular tank, $a$. This function cannot be optimized with respect to the distance between the plates, $D$, because it is obvious both from the equation itself and from physical reasoning that the narrower the gap the better the sedimentation. The optimal width of the gap between the plates ($D$) must be obtained from the properties of the influent suspension. However, it should be noted that the relationships between the other three design parameters at the optimum are not strongly affected by the distance between the plates; this will be seen later.

To obtain the parameters $\alpha$, $a$, and $L$ for the minimization of the value of $\epsilon$, one differentiates equation (11) with respect to these parameters and sets the derivatives equal to zero. These equations, as listed below, are used for the optimal design of a rectangular sedimentation device inserted into a circular tank.

$$2(a/R)^2 - (a/R)(L/R)\tan\alpha - 4 = 0 \quad (12)$$
$$(a/R) - (D/R)\sin\alpha\cot\alpha - 2(L/R)\tan\alpha = 0 \quad (13)$$

$$(L/R)(D/R)\sin\alpha - (a/R)(D/R)\cos\alpha - (L/R)^2\sec^2\alpha \quad (14)$$
$$-\cot\alpha[(a/R)(d/R)\sin\alpha + (L/R)(D/R)\cos\alpha$$
$$-(a/R)(L/R) + (L/R)^2\tan\alpha] = 0$$

In some cases, it may be of interest to design for an optimum with respect to all three variables, whereas in other cases, the optimum may be desired with one of the variables fixed. For example, one might want to specify the angle of the plates to insure that the suspended solids will slide off the plates and then search only for the optimum $a$ and $L$. For both of these hypothetical cases, the above equations are used, however, not all of them are used in each instance.

The problem of obtaining the optimum values for all three variables can be dismissed rather quickly since no such optimum exists. Upon trying to solve the above three equations simultaneously for the three design variables, one quickly ascertains that the solution exists as the angle approaches zero degrees from the vertical and the height of the lamina device approaches infinity. Such a solution is obviously not achievable in the practical world.

The realistic problems of finding the best values of the parameters $a$ and $L$ for a given angle, $\alpha$, and of finding the best values of $a$ and $\alpha$ for a given device length, $L$, are easily calculated using equations 12 through 14. For design with a predetermined angle, $\alpha$, one uses equations 12 and 13 to solve simultaneously for $a$ and $L$. For given device height, $L$, the solutions of equations 12 and 14 produces the optimal values of the design parameters.

Beginning with the derivations of equations (1) and (2) above, the same procedure can be repeated for the other possible cases. For the cylindrical tank, one can consider the cases of the tank in a vertical position with the flow being either upward or downward, or the tank in a horizontal position with the flows again up or down. These same four cases can be developed for a rectangular shaped tank as shown in FIGS. 6 and 7. The results of these derivations can be summarized in three equations correponding to the three design formulae for the upflow in a cylindrical tank given by equations 12 to 14. The reference vector for these equations points in the vertical or horizontal direction corresponding to the orientation of the tank and in the direction of the fluid flow. For each different case, some parameters of the equations are altered. These general equations are presented below (15 to 17)

$$2(a/R)^2 - (a/R)(L/R)\tan\alpha - 4 = 0 \quad (15)$$

$$(a/R) - A(D/R)\sin\alpha\, f(\alpha) - 2(L/R)\tan\alpha = 0 \quad (16)$$

$$A[(L/R)(D/R)\sin\alpha - (a/R)(D/R)\cos\alpha] -$$
$$(L/R)^2\sec^2\alpha - Af(\alpha)\{(a/R)(D/R)\sin\alpha + (L/R)$$
$$(D/R)\cos\alpha - B[(a/R)(L/R) - (L/R)^2\tan\alpha]\} = 0 \quad (17)$$

where $$A = \begin{cases} +1 \text{ for upflow} \\ -1 \text{ for downflow} \end{cases}$$

$f(\alpha) = \cot\alpha$; $B = +1$ for vertical tanks $f(\alpha) = \tan\alpha$; $B = -1$ for horizontal tanks $$a/R = \begin{cases} \text{variable for cylindrical tanks} \\ 1 \text{ for rectangular tanks} \end{cases}$$

For cylindrical tanks, one always uses equation (15) and along with it either equation (16) or (17) depending upon which of the parameters, $\alpha$, or $L/R$ are given. If $L/R$ is a preset design value, then 15 and 17 are used to determine the angle, $\alpha$, and the ratio $a/R$. For a given angle $\alpha$, one uses equations (15) and (16). For the case of rectangular tanks, only equations (16) and (17) are used with $a/R$ set equal to one. Equation 16 is used for a given angle $a$ to find the optimal value of the device length, $L/R$ or equivalently $L/a$. For a given value of $L/a$ equation (17) supplies the required optimal angle $\alpha$.

A typical example of the use of these equations for the design of sedimentation devices will be given in the following presentation of the preferred embodiment of the invention wherein the tank is rectangular.

A lamina 122 of the present invention has been made in accordance with the mathematical analysis as above presented wherein in a lamina tank that is 12 feet long, 6 feet wide and 16 feet deep is employed, the lamina plates 200 being 6 feet long and disposed at an angle to the horizontal of 70°. The plates 200 are spaced apart by a space "D" that is equal to 2 inches. This arrangement has been found very effective in treating domestic sewage that has previously been treated with a coagulating agent and polyelectrolyte for the flocculation of numerous solids therein.

The lamina of the present invention may be (and is in the desired embodiment) of great size and means are provided to facilitate its fabrication and installation so as to make it practical to construct and maintain laminas of such mass. Thus, the present lamina is made of a multiplicity of plates that have been sectionalized and are joined by connecting members into which the plates are press fitted and preferably cemented so as to greatly facilitate the ease of the fabrication. In addition, the lamina is preferably built in a number of separate sections that are placed into side-by-side relation to function essentially as an integral whole.

Figure 11:
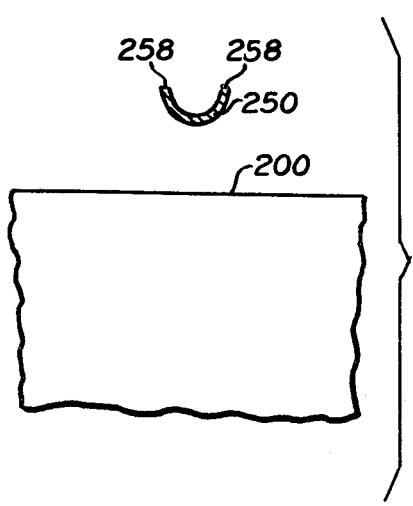
FIG. 11 is a sectional view taken along line 11—11 of FIG. 6.

As may best be seen in FIG. 11, the lamina is preferably made of three longitudinally extending sections which are in side-by-side relation. These sections are designated 202, 204 and 206. The three sections are identical and interchangeable as to position. Portions of section 202 and 204 are shown in FIG. 8 and will be described in detail.

Figure 10:
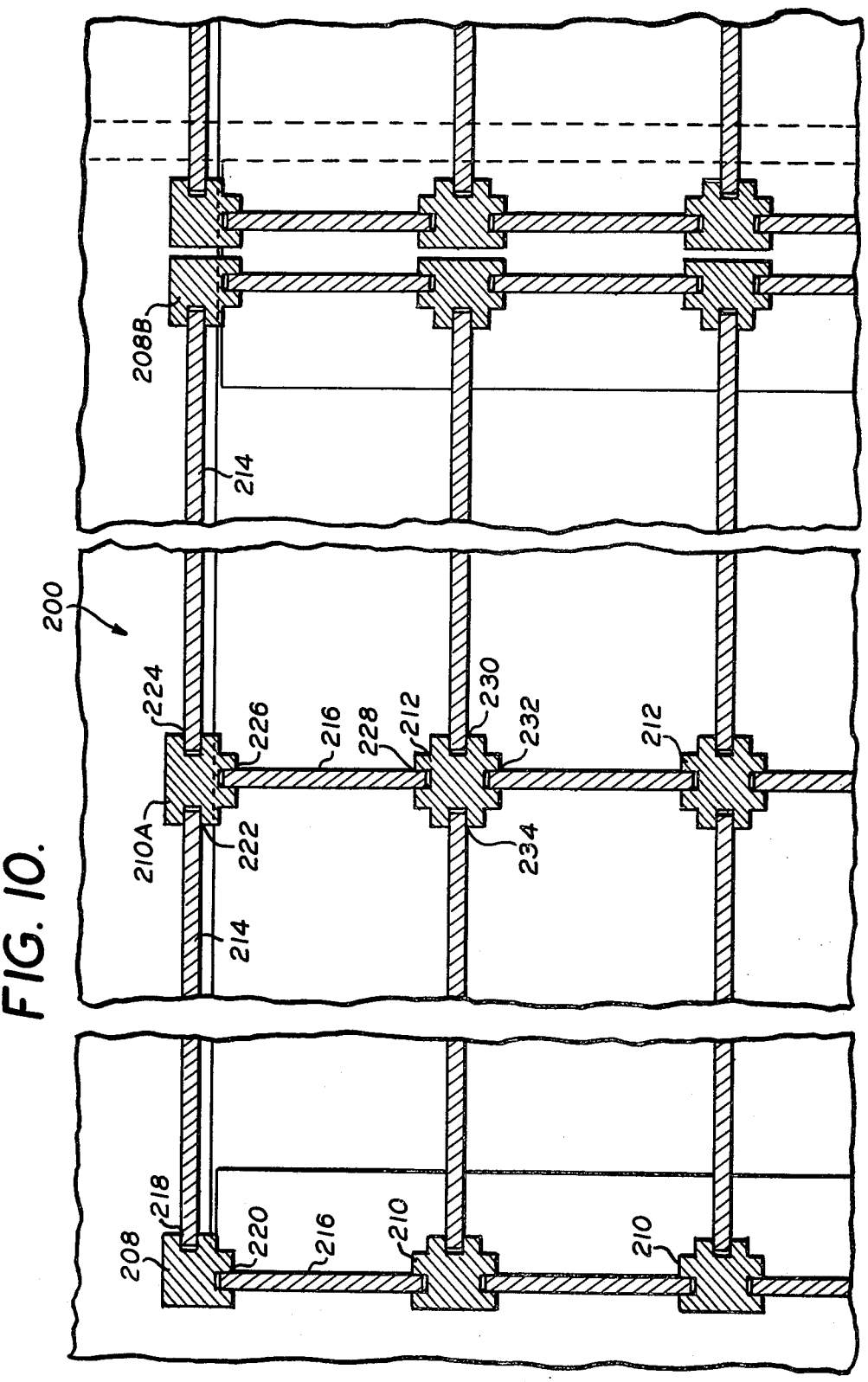
FIG. 10 is a fragmentary top plan view of the lamina shown in FIG. 9.

Specifically, the section 202 is formed of a plurality of elongated corner members 208, T-members 210 and cross members 212 between which are plate modules 214 and spacers 216. The corner members 208 are essentially square in cross section and are provided with grooves in two mutually perpendicular longitudinally extending surfaces, the grooves being designated by the reference characters 218 and 220. The T-members are rectangular in configuration and are provided with three grooves, two in longitudinally extending surfaces parallel to one another, the grooves being designated by the reference characters 222 and 224, and a third groove 226 in the longitudinally extending surface perpendicular to the other two and extending therebetween. The cross members 212 are essentially square in cross-section and are provided with four grooves 228, 230, 232 and 234, one in each of the longitudinally extending surfaces of the member. All of the members 208, 210 and 212 are long, preferably the same length as, or slightly longer than, plates 200, namely, about 6.4 feet. The corner members 208 are spaced apart the width of the module 202. However, the plate modules 214 are approximately one-half of the width of the module, there being interposed in the middle of the module the T-member 210 in order to permit the introduction of central spacers 216 to give the module adequate stiffness for ready handleability. Spacers 216 have a width about equal to the space D, although this may be somewhat modified to compensate for the presence of T-members, cross-members and corner members. The plate modules 214 are slid into the grooves 218 and 222, preferably after the application of a suitable cement, thereby to form a firm rigid construction between the corner member 208 and the T-member 210 and the plate module 214. Likewise to the right of the T-member 210A, the right hand plate module 214 is glued into the groove 224 and into a groove in the corner member 208b at the right side of the front of the module as was in FIG. 6. The remainder of the construction will be apparent to anyone skilled in the art as he views FIG. 10, whereby to build a grid construction approximately two plate module 214 wide and as long as the number of plates being installed in the lamina, this being determined by the design parameters hereinbefore presented. Each of the modules 204 and 206 is constructed identically with the module 202. Thereafter, the modules 202, 204 and 206 may be placed into the lamina tank 122 and may be supported by any suitable underlying support structure such as, for example, a plurality of angle iron supports which underly the modules and hold them at the desired depth. These angle irons may be seen in FIGS. 5 and 6 wherein they are designated by the reference characters 236.

Figure 8:
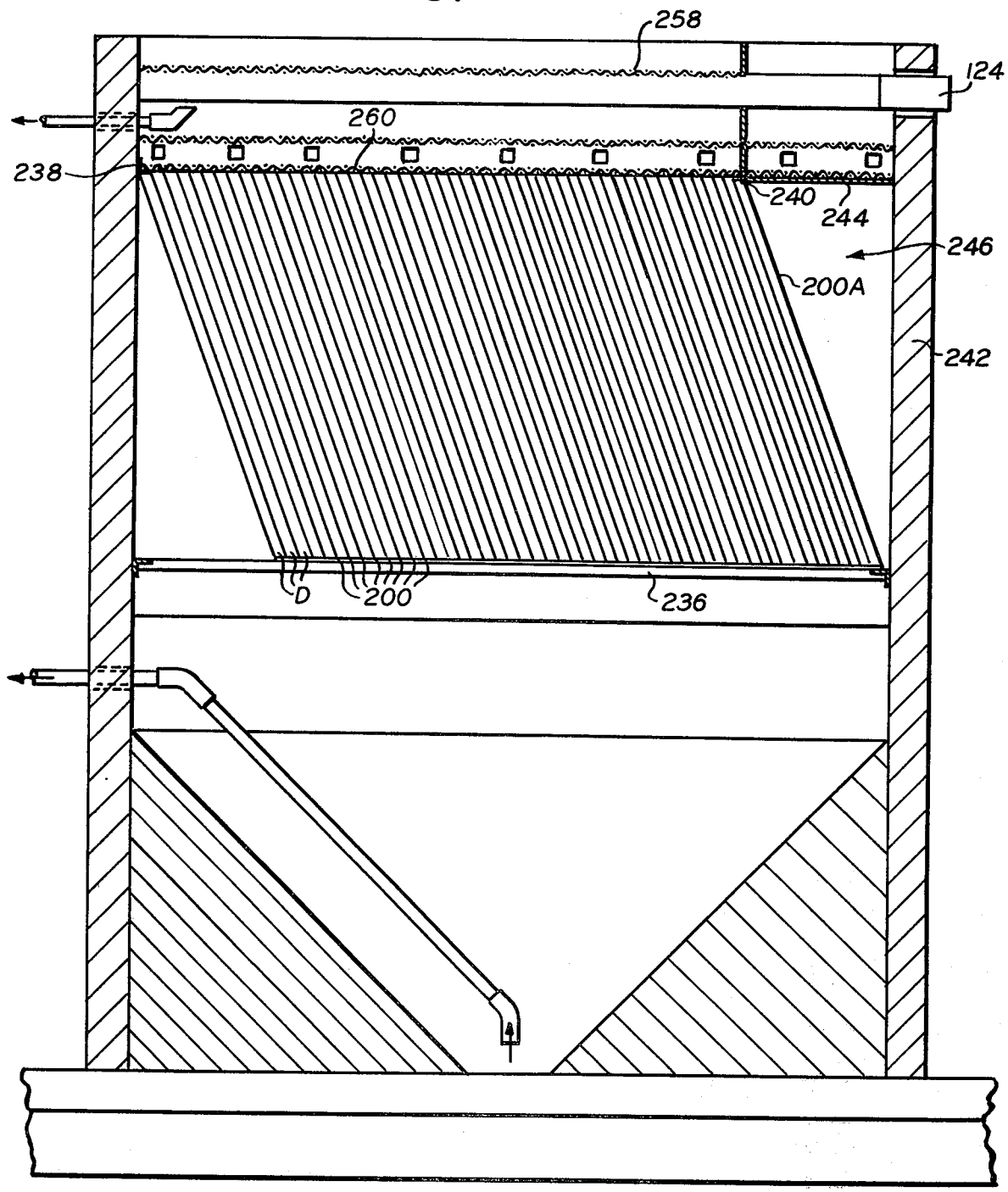
FIG. 8 is a sectional view taken along line 8—8 of FIG. 6.
Figure 9:
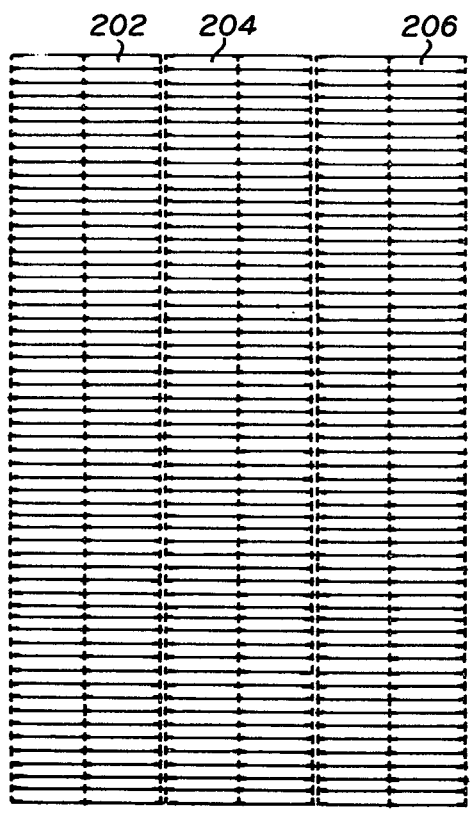
FIG. 9 is a top plan view of the preferred form of lamina embodying the present invention.

With the modules in place, to hold them securely, as shown in FIG. 8, a pair of transversely extending angle irons 238 and 240 may be bolted in place above them to hold them secure. From the front most plate 200A in FIG. 8 over to the wall 242 of the tank, there is preferably disposed a plate 244 for preventing liquid from falling into the space 246, whereby to prevent the slow deposition of particles within such space which would require periodic cleaning. However, if the periodic cleaning is not deemed burdensome, the plate 244 may be dispensed with.

One of the major problems in the design, construction and utilization of laminas is to insure that the flow between each pair of adjacent plates will be essentially the same as the flow between every other pair of plates. The reason for this is that if the flow is uneven, the particle distribution exiting at the top of the plates will be different, thereby to give an uneven and undesirable separation of particles for the overall lamina. That is to say, that if the average flow through the lamina or the total flow through the lamina is what is desired, but the flow between certain plates is too high, then, based on the analysis already presented, the particles entrained in the liquid flowing through that high velocity pair will be too large for the design of the lamina. The numbers entrained will also be too numerous. To eliminate this, means are provided herein for equalizing flow throughout all of the lamina and the preferred means are shown in FIGS. 6, 7 and 8. In accordance with these figures, in the preferred form of means for eliminating unequal flow, a plurality of troughs, here shown as three in number and designated 250, 252 and 254 extend the length of the lamina 122 and are joined together at 256 to provide for an out flow of the effluent through the effluent pipe 124. The number of troughs forms no part of the present invention and may be any number from one on up. However, a practical number above one, such as three, is preferred as the more troughs that are included, the slower will be the velocity of the liquid spilling over into the troughs and the greater will be the separation of unwanted particles from the liquid. The troughs are shown to be disposed above the tops of of the plates 200, and preferably substantially above the tops of those plates, of the order of at least about seven inches. In the preferred form of the invention being described herein with the lamina and size of construction heretofore as described in detail, we have found that the top edges 258 of the troughs are preferably about twelve inches above the tops of the plates 200 (see FIG. 11). The diameter of the troughs may be of the order of about six inches for a lamina of the size presently being described. However, the diameter is not critical and merely is a matter of convenience for fabrication and for handling the flow of the liquid to flow therethrough.

With the troughs 250, 252 and 254 so located, as the liquid passes up through the lamina between plates 200, depositing particulate material as it travels, it will exit at the upper ends of the plates 200 where it will encounter substantial head of clarified liquid as already described. This substantial head of clarified liquid serves to equalize the pressure across the entire surface of the lamina, whereby to equalize the flow of the liquid between each of the pairs of plates. The maintenance of the head at the desired value, coupled with a very low spill velocity of clarified liquid flowing into the troughs will yield an exceedingly high quality effluent with very little entrained particles and these of very small particle size. The clarified liquid will work its way from the top of the plates 200 upwardly and, if necessary, sideways, until it encounters one of the edges 258 of a trough whereupon the liquid will spill over the edge and into the trough to be slowly carried towards the effluent pipe 124. The edges 258 of the troughs can be very carefully controlled as to their height so that one achieves a very long weir whereby to keep the velocity of the liquids spilling into the weir very low. With such a low velocity for the liquid as it pours over the weir, any entrained particles of significant diameter will not be able to maintain themselves at the surface of the liquid. If the height of the liquid is carefully adjusted so that it will be very little above the trough edges 258, these larger particles will not move over the edges 258, but will impinge on the sides of the troughs 250, 252 and 254 and will thereafter fall downwardly, perhaps through the plates to the bottom of the lamina plant. Preferably, although not necessarily, the edges 258 of the troughs may be sawtoothed, whereby to use the well known expedient of a sawtooth weir which enables the manufacturer to adjust the weir to precisely the desired level, vis-a-vis the water level. This is a well known expedient and forms no part of the invention per se.

Other means for equalizing the flow of liquid through the lamina can be employed as an alternative or in addition to the high head of clarified liquid as hereinbefore described. Thus, as shown in FIGS. 7 and 8, a screen 260 is disposed above the tops of the plates 200, preferably resting thereon, which screen is of mesh size such as to permit the largest particles that theoretically may pass through the lamina to pass through the spaces in the screen without interference. Thus, the screen does not serve as a sieve to prevent the passage of particulate material therethrough. The purpose of the screen is to serve as a wide area throttle to reduce the flow of liquid that may be flowing more rapidly than desired and thereby causing a slight increase in the flow of the liquid that is flowing at less than the velocity designed for the lamina to thereby achieve substantially uniform flow. Preferably the mesh size of the screen is not significantly above that required to permit the passage of particulate material therethrough as the smaller the mesh size of the screen, the more uniform will be the throttling action and hence the more uniform will be the flow therethrough.

Figure 12:
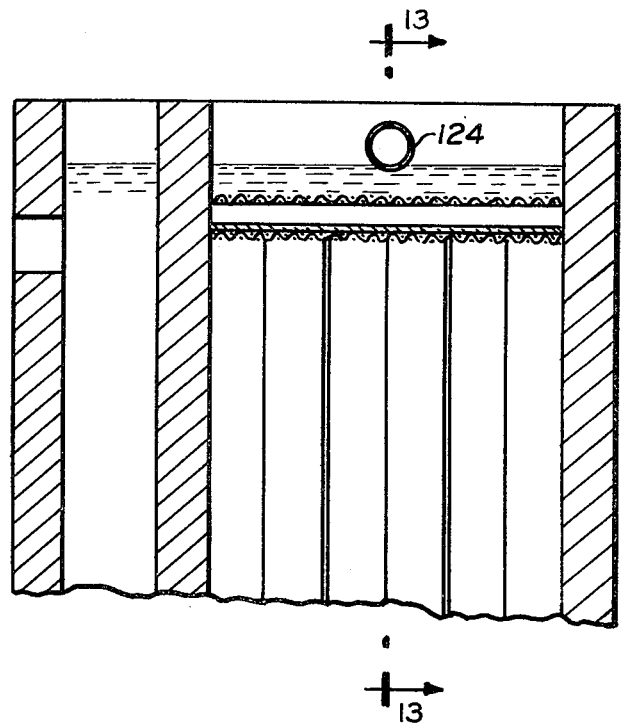
FIG. 12 is a view similar to FIG. 7 illustrating a modified lamina embodying this invention.
Figure 13:
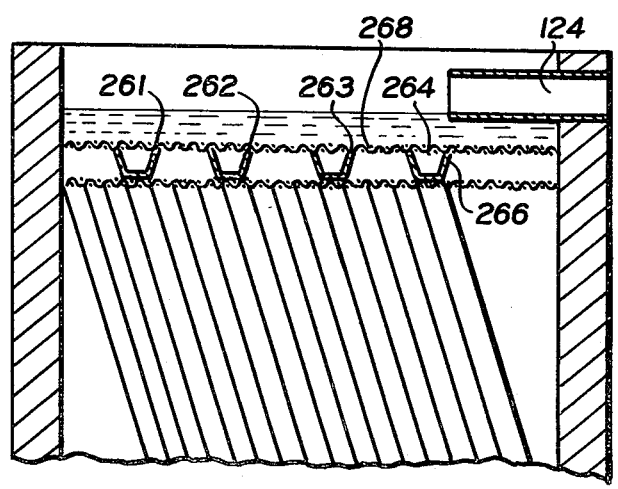
FIG. 13 is a sectional view taken along line 13—13 of FIG. 12.

As shown in FIGS. 12 and 13, other means may be incorporated to further reduce particulate material that has passed between the plates 200 of the lamina 122. Thus, for example, if the troughs 250, 252 and 254 are not included, a plurality of transversely extending troughs 261, 262 and 263 may be included, the word transverse herein being employed to mean transverse to the direction of flow of the liquid above the plates 200. As the liquid leaves the tops of the plates and flows towards the weir 266 in the lamina 122 of FIGS. 12 and 13, it will be forced to pass over the troughs 261, 262, 263 and 264, which troughs will block out the vertically moving liquid that exits between the tops of the plates in their respective vicinities. Thus, the troughs will provide eddies in which there is no upward velocity component in the flowing liquid. With no upward component entrained solids in the horizontally moving liquid that is moving across the top of the lamina towards the weir 266, there will be insufficient upward force to maintain the solids entrained therein and the solids will drop out into the transversely extending troughs, whereby to further clarify the liquid that has passed through the lamina. Thus, the liquid leaving the lamina by passing over the weir will be further reduced in its particulate content.

While the use of the troughs 261, 262, 263 and 264 described herein, as illustrated in FIGS. 12 and 13, in combination with the screen 260, it will be understood that the troughs 261, 262, 263 and 264 may be employed without the close cooperation of the screen, and, of course, the screen 260 may be employed without the use of the troughs. When the troughs are employed, with or without the screen 260, they will accumulate within them significant quantities of particulate material as the lamina is employed. The troughs may be cleaned either by making them readily removable whereby they may be lifted out from the lamina periodically and flushed to remove the particulates or they may be cleaned hydraulically by providing a plurality of jets at one end of each of the troughs which will flush the troughs while they remain in position.

If desired, the combination of the troughs and screens may be further enhanced with respect to the quality of uniform flow throughout by providing a second screen 268 on top of the troughs 261, 262, and 263, in which event the troughs will serve not only in the capacity hereinbefore described, but will also serve as spacers between the two screens. In the alternative, the two screens may be employed with ordinary spacers 269 to hold the screens in slightly spaced apart relation, which spacing enables an additional increase in uniformity of flow throughout the lamina (see FIGS. 7 and 8).

The lamina is constructed as previously described in assembling the supporting members, that is the corner members 208, the T-members 210 and the cross members 212, with the intervening plate modules 214 and spacers 216 to form the section of lamina, which sections have been designated by the reference characters 202, 204 and 206. The lamina sections are then disposed within the tank 122 in side-by-side relation and are preferably secured in such position by the angles 238 and 240. A cover plate 244 may be provided to extend from the top of the forwardmost lamina plate 200A to the wall 242 of the lamina tank. Thereafter, if the troughlike weirs 250, 252 and 254 are employed, the central weir 252 is preferably first disposed between the front and back walls of the lamina tank and is leveled to make sure that it is at the right vertical position above the tops of the lamina plates. Then the side troughs 250 and 254 are set in, their rear ends being secured to the rear wall of the lamina and their forward ends being joined to the central trough 252. In this position, the troughs 250 and 254 are also leveled and are made co-planar with the weir trough 252. The level at which the tops of the weir troughs is set is one of choice and in choosing the location, the designer must take into account the desirability of a significant hydraulic head above the lamina plates as well as take into account the amount of flow which the plate is designed for. With such construction completed, the lamina is ready for use. In the alternative embodiment of FIGS. 12 and 13, after the lamina of the structure of FIGS. 5 and 6 is completed and installed as heretofore described, the screen 260 may be laid over the tops of the plates and the lamina is ready for use. If the transversely extending troughs 261–264 are employed, they may be disposed within the lamina tank with the bottoms of the troughs relatively close to the tops of the lamina plates. The transversely extending troughs may be secured to the side walls of the plate if desired. Naturally, if the second screen 268 is to be employed, this would be laid over the tops of the transversely extending troughs. The use of the lamina is the same as for all previously known laminas. Essentially, the liquid is introduced into the lamina tank beneath the plates and is permitted to flow upwardly between the plates and thence outwardly over the weirs, either a straight weir as in FIGS. 12 and 13 or the trough-type longitudinally extending weirs of FIGS. 6, 7 and 8, and thence to the effluent exit 124.

While the screens illustrated herein are shown to be stationary, it will be obvious that the screens should be removable for periodic cleaning. Thus, the screens can be disposed in frames that are releasably mounted as illustrated in the drawings.

An alternative to removable, stationary screens would be to have the screens movable whereby to present periodically fresh screening to the lamina while the remainder is removed from the screening position. This can be accomplished by having the screens mounted on rollers, one roller being the feed roller, the other being the take up roller, the rollers being disposed on opposite sides of the lamina. Manual, semi-automatic or automatic means can be provided for continuously or periodically shifting the screens toward the take up roller whereby to present fresh clean screening to the top of the lamina.

Still another alternative for reducing the fouling of the screen is to mount screens of an oscillatory mechanism for oscillating or reciprocating the screen in close confronting relation with one end of the lamina, generally the top. The movement of the screen will not effect its ability to throttle. However, the movement will reduce the likelihood of the screen becoming foul.

While we have herein shown and described the preferred form of the present invention and have suggested modifications therein, other changes and modifications may be made therein within the scope of the appended claims without departing from the spirit and scope of this invention.

What is claimed is:

1. A clarifier, comprising:
   a tank having an inlet and an outlet for a liquid having entrained solids;
   a lamina including a plurality of spaced apart substantially parallel plates disposed at an angle to the horizontal and vertical, said lamina being disposed between said inlet and outlet so that said liquid passes between said plates as it progesses from said inlet to said outlet, and throttling means at the outlet ends of said plates for equalizing flow within said plates, said throttling means comprising a screen disposed on the outlet edges of said plates.

2. A clarifier of claim 1, wherein said screen is of a mesh close to and larger than the largest particle which said clarifier is designed to pass.

3. A clarifier of claim 1, and further comprising a second screen, and spacer means for supporting said second screen in close vertically spaced relation with said first mentioned screen.

4. The clarifier of claim 1, wherein said inlet and outlet are arranged so that the liquid flows between said plates from bottom to top, and said throttling means comprises a screen resting on the top edges of said plates.

5. The clarifier of claim 4, and further comprising a trough disposed above the screen and transversely of the direction of flow of liquid toward said outlet.

6. The clarifier of claim 4, and further comprising a plurality of spaced apart troughs disposed above the screen and transversely of the direction of flow of liquid toward said outlet.

7. The clarifier of claim 6, and further comprising a second screen resting on the top of said trough.

8. The clarifier of claim 7, wherein said screens are of a mesh close to and larger than the largest particle which said clarifier is designed to pass.

9. The clarifier of claim 4, wherein said screen is of a mesh close to and larger than the largest particle which said clarifier is designed to pass.

10. The clarifier of claim 1 further comprising a vertically extending circular tank having an axial reference vector and a radius "R" and wherein said substantially parallel plates are disposed in said tank in a rectangular array and spaced apart from one another by a distance "D", said plates being disposed at an angle to the reference vector "α" and extending in the reference vector direction a distance "L", and means for causing the liquid to be clarified to flow upwardly through said array, said array having a side length of "a" wherein:

$$2(a/R)^2 - (a/R)(L/R)\tan\alpha - 4 = 0 \quad (a/R) - A(D/R)\sin\alpha f(\alpha) - 2(L/R)\tan\alpha = 0$$

$$A[(L/R)\ (D/R)\sin\alpha - (a/R)\ (d/R)\cos\alpha - (L/R)^2\sec^2\alpha - Af(\alpha)\ [(a/R)\ (D/R)\sin\alpha + (L/R)\ (D/R)\cos\alpha - B\{(a/R)\ (L/R) + (L/R)^2\tan\alpha\}] = 0$$

where $A = 1$ [for upflow]
      $-1$ for downflow]
$f(\alpha) = \cot\alpha$ [for vertical tanks]
           $= \tan\alpha$ for horizontal tanks]
$B = +1$ [for vertical tanks]
      $-1$ for horizontal tanks]
$a/R = 1$.

11. The clarifier of claim 1 further comprising a vertically extending rectangular tank having an axial reference vector, a length "$a$" and an arbitrary width and wherein said substantially parallel plates are disposed within said tank in a rectangular array and wherein said parallel plates are spaced apart a distance "$D$" and are disposed at an angle "$\alpha$" to said reference vector and extend in a direction of said reference vector a distance "$L$", the projected area of said array filling the tank, and means for causing the liquid to be clarified to flow upwardly through said array, wherein:

$$(a/R) - A(D/R)\sin\alpha\, f(\alpha) - 2(L/R)\tan\alpha = 0$$

$$A[(L/D)\ (D/R)\sin\alpha - (a/R)\ (D/R)\cos\alpha] - (L/R)^{-2}\sec^3\alpha - Af(\alpha)\ \{(a/R)\ (D/R)\sin\alpha + (L/R)\ (D/R)\cos\alpha - B[(a/R)\ (L/R) - (L/R)^2\tan\alpha]\} = 0$$

and wherein $A = 1$ [for upflow]
      $-1$ for downflow]
$f(\alpha) = \cot\alpha$ [for vertical tanks
           $= \tan\alpha$ for horizontal tanks]
$B = +1$ [for vertical tanks
      $-1$ for horizontal tanks]
$a/R = 1$.

12. The clarifier of claim 1 further comprising a horizontally circular tank having an axial reference vector and a radius "$R$", said plurality of parallel plates being disposed within said tank within a rectangular array of said plates being spaced apart by a distance "$D$", said plates being disposed at an angle to the reference vector of "$\alpha$" and extending in the reference vector direction a distance "$L$", and means for causing the liquid to be clarified to flow upwardly through said array, said array having a side length of "$a$" wherein:

$$2(a/R)^2 - (a/R)\ (L/R)\tan\alpha - 4 = 0$$

$$(a/R) - A(D/R)\sin\alpha\, f(\alpha) - 2(L/R)\tan\alpha = 0$$

$$A[(L/R)\ (D/R)\sin\alpha - (a/R)\ (d/R)\cos\alpha\ ] - (L/R)^2\sec^2\alpha - Af(\alpha)\ [(a/R)\ (D/R)\sin\alpha + (L/R)\ (D/R)\cos\alpha - B\{(a/R)\ (L/R) + (L/R)^2\tan\alpha\ \}] = 0$$

where
$A = 1$
$f(\alpha) = \tan\alpha$
$B = +1$
$a/R = 1$.

13. The clarifier of claim 1 further comprising a horizontally circular tank having an axial reference vector and a radius "$R$", said plurality of parallel plates being disposed within said tank within a rectangular array of said parallel plates being spaced apart by a distance "$D$", said plates being disposed at an angle to the reference vector of "$\alpha$" and extending in the reference vector direction a distance "$L$", and means for causing the liquid to be clarified to flow downwardly through said array, said array having a side length of "$a$" wherein:

$$2(a\text{-}R)^2 - (a/R)\ (L/R)\tan\alpha - 4 = 0$$

$$(a/R) - A(D/R)\sin\alpha\, f(\alpha) - 2(L/R)\tan\alpha = 0$$

$$A[(L/R)\ (D/R)\sin\alpha - (a/R)\ (d/R)\cos\alpha] - (L/R)^2\sec^2\alpha - Af(\alpha)\ [(a/R)\ (D/R)\sin\alpha + (L/R)\ (D/R)\cos - B\{(a/R)\ (L/R) + (L/R)^2\tan\alpha\}] = 0$$

where
$A = -1$
$f(\alpha) = \cot\alpha$
$B = +1$
$a/R = 1$.

14. The clarifier of claim 1 further comprising a horizontally extending circular tank having an axial reference vector and a radius "$R$", said plurality of parallel plates being disposed within said circular tank in a rectangular array, said parallel plates being spaced apart by a distance "$D$" and being disposed at an angle to the reference vector of "$\alpha$" and extending in the reference vector direction a distance "$L$", and means for causing the liquid to be clarified to flow downwardly through said array, said array having a side length of "$a$" wherein:

$$2(a/R)^2 - (a/R)\ (L/R)\tan\alpha - 4 = 0$$

$$(a/R) - a(D/R)\sin\alpha\, f(\alpha) - 2(L/R)\tan\alpha = 0$$

$$A[(L/R)\ (D/R)\sin\alpha - (a/R)\ (d/R)\cos\alpha] - (L/R)^2\sec^2\alpha - Af(\alpha)\ [(a/R)\ (D/R)\sin\alpha + (L/R)\ (D/R)\cos\alpha - B\{(a/R)\ (L/R) + (L/R)^2\tan\alpha\}] = 0$$

where
$A = -1$
$f(\alpha) = \tan\alpha$
$B = -1$
$a/R = 1$.

15. The clarifier of claim 1 further comprising a horizontally circular tank having an axial reference vector and a radius "$R$" and said plurality of parallel plates being disposed within said tank within said plates being spaced apart by a distance "$D$", said plates being disposed at an angle to the reference vector of "$\alpha$" and extending in the reference vector direction of a distance "$L$", and means for causing the liquid to be clarified to flow upwardly through said array, said array having a side length of "$a$" wherein:

$$2(a/R)^2 - (a/R)\ (L/R)\tan\alpha - 4 = 0$$

$$(a/R) - A(D/R)\sin\alpha\, f(\alpha) - 2(L/R)\tan\alpha = 0$$

$$A[(L/D)(D/R)\sin\alpha - (a/R)(d/R)\cos\alpha] - (L/R)^2 \sec^2\alpha - Af(\alpha)[(a/R)(D/R)\sin\alpha + (L/R)(D/R)\cos\alpha - B\{(a/R)(L/R) + (L/R)^2\tan\alpha\}] = 0$$

where
$A = 1$
$f(\alpha) = \tan\alpha$
$B = +1$
$a/R = 1$.

16. The clarifier of claim 1 further comprising a horizontally circular tank having an axial reference vector and a radius "$R$", said plurality of parallel plates being disposed within said tank within a rectangular array of said parallel plates being spaced apart by a distance "$D$", said plates being disposed at an angle to the reference vector of "$\alpha$" and extending in the reference vector direction a distance "$L$", and means for causing the liquid to be clarified to flow downwardly through said array, said array having a side length of "$a$" wherein:

$$2(a-R)^2 - (a/R)(L/R)\tan\alpha - 4 = 0$$

$$(a/R) - A(D/R)\sin\alpha f(\alpha) - 2(L/R)\tan\alpha = 0$$

$$A[(L/R)(D/R)\sin\alpha - (a/R)(d/R)\cos\alpha] - (L/R)^2 \sec^2\alpha - Af(\alpha)[(a/R)(D/R)\sin\alpha + (L/R)(D/R)\cos\alpha - B\{(a/R)(L/R) + (L/R)^2\tan\alpha\}] = 0$$

17. The clarifier of claim 1 further comprising a horizontally extending circular tank having an axial reference vector and a radius "$R$", said plurality of parallel plates being disposed within said circular tank in a rectangular array, said parallel plates being spaced apart by a distance "$D$" and being disposed at an angle to the reference vector of "$\alpha$" and extending in the reference vector direction a distance "$L$", and means for causing the liquid to be clarified to flow downwardly through said array, said array having a side length of "$a$" wherein:

$$2(a/R)^2 - (a/R)(L/R)\tan\alpha - 4 = 0$$

$$(a/R) - A(D/R)\sin\alpha f(\alpha) - 2(L/R)\tan\alpha = 0$$

$$A[(L/R)(D/R)\sin\alpha - (a/R)(d/R)\cos\alpha] - (L/R)^2 \sec^2\alpha - Af(\alpha)[(a/R)(D/R)\sin\alpha + (L/D)(D/R)\cos\alpha - B\{(a/R)(L/R) + (L/R)^2\tan\alpha\}] = 0$$

where
$A = -1$
$f(\alpha) = \tan\alpha$
$B = -1$
$a/R = 1$.

* * * * *